United States Patent [19]

Blytas et al.

[11] Patent Number: 4,784,673

[45] Date of Patent: Nov. 15, 1988

[54] DESICCANT COMPOSITION FOR SUPERCRITICAL $CO_2$

[75] Inventors: George C. Blytas; Zaida Diaz, both of Houston, Tex.

[73] Assignee: Shell Oil Company, Houston, Tex.

[21] Appl. No.: 74,669

[22] Filed: Jul. 17, 1987

[51] Int. Cl.$^4$ .................. C01B 31/20; B01D 53/02; B01D 53/14
[52] U.S. Cl. ........................... 55/29; 55/DIG. 17; 55/32; 55/68; 423/437
[58] Field of Search ............... 423/437; 252/194; 62/271; 55/29, 30, 31, 32, DIG. 17

[56] References Cited

U.S. PATENT DOCUMENTS 4,478,612 10/1984 Diaz et al. .............................. 55/32
4,560,812 12/1985 Blytas ................................. 423/178
4,686,246 8/1987 Gajria ................................. 401/232

OTHER PUBLICATIONS

Arthur B. Allyne, "The Dehydration of High-Pressure Natural Gas", Gas Age-Record, May 18, 1935.

*Primary Examiner*—Robert L. Stoll
*Assistant Examiner*—Adriana L. Mui

[57] ABSTRACT

Supercritical $CO_2$ is dried by use of a desiccant composition comprising glycerine and bis-hydroxymethyl dioxane, especially a by-product composition recovered from an effluent stream from the production of epoxy resins.

6 Claims, No Drawings

4,784,673

DESICCANT COMPOSITION FOR SUPERCRITICAL $CO_2$

FIELD OF THE INVENTION

The present invention relates to a desiccant composition and the use thereof for drying supercritical carbon dioxide.

BACKGROUND OF THE INVENTION

Supercritical (fluid) carbon dioxide ($CO_2$) is different from conventional liquids and gases in that it is a dense fluid which is compressible like a gas but unlike a gas is pumpable like a liquid. It is desirable to pipeline $CO_2$ as a supercritical single phase fluid, for ultimate use, e.g., as an injection fluid in tertiary oil recovery, and to have a dry fluid carbon dioxide to prevent corrosion during the transport and utilization of supercritical carbon dioxide as an injection fluid.

Generally, $CO_2$ produced from wells is depressurized, demoisturized in the gaseous state and repressurized at the field location for pipelining in its supercritical state. This requires (1) sizable on-site equipment for depressurization, demoisturizing, pressurizing and solvent handling and (2) high energy demands. In the case of supercritical $CO_2$, most of the conventional desiccants used for gases don't work well because supercritical $CO_2$ is a very good solvent, and itself undesirably dissolves many potential treating solvents. Also, moisture removal is not possible unless the solvent can form a separate non-miscible phase.

U.S. Pat. No. 4,478,612 describes a process for the desiccation of supercritical $CO_2$ using glycerol. However, commercial glycerol is expensive and some of the glycerol is lost because of solubility of glycerol in the supercritical $CO_2$. In the above patent, it is noted that the glycerol recycled from the regenerator is 99% pure and the same is said for the prior use of triethylene glycol. Clearly, use of such high grade desiccants can be expensive and impractical at field locations.

Surprisingly, it has been found that certain compositions of glycerine with certain dioxane derivatives are good desiccant compositions for the removal of moisture from supercritical $CO_2$ overcoming disadvantages in the use of commercial glycerol. Moreover, the new drying agents for supercritical $CO_2$ can be obtained in an inexpensive manner as the by-products of other processes, thus, reducing the cost of desiccant but yet providing better desiccant properties for the dehydration of supercritical $CO_2$ than various highly pure reagents of the prior art.

SUMMARY OF THE INVENTION

The present invention is directed to a novel desiccant composition and the use thereof for drying substantially supercritical carbon dioxide. More specifically, the present invention is directed to a process for reducing the moisture content of substantially supercritical moist carbon dioxide which comprises contacting moist carbon dioxide at substantially supercritical conditions of temperature and pressure with a desiccant composition comprising glycerine containing a minor amount of up to about 20% by weight, of at least one bis-hydroxymethyl dioxane based on the total weight of the composition, and recovering substantially supercritical carbon dioxide having a reduced moisture content.

The use of the desiccant composition of the present invention to remove moisture from moist supercritical $CO_2$ reduces corrosion in the subsequent pipelining and use of supercritical $CO_2$, and reduces the cost of using commercial glycerol and the loss thereof because of solubility of glycerol in the supercritical $CO_2$. Also, because the solvent compositions of the present invention have a lower viscosity than commercial glycerol, the mass transfer is improved and it is easier to pump the desiccant. The solvent compositions of the present invention also have a lower freezing point than pure commercial glycerol and this can be useful in dehydration at remote locations and in the transport of the solvent composition in cold weather conditions.

Bis-hydroxymethyl dioxane is a dimer of glycerol (commonly referred to as diglycerol) and includes the four isomer forms, i.e., cis-2,5-bis-dihydroxymethyl dioxane, trans-2,5-bis-dihydroxymethyl dioxane, cis-2,6-bis-dihydroxymethyl dioxane and trans-2,6-bis-dihydroxymethyl dioxane. These isomers, which are not present to any degree in pure commercial glycerol, are useful in the desiccant composition of the present invention because their presence surprisingly alters the properties of the desiccant in terms of properties which are practically important, such as (1) a lower solubility in $CO_2$ so that less of the desiccant composition is lost in the attempts to dehydrate $CO_2$; (2) a lower freezing point of the novel desiccant of the invention, which aids in the handling and use in cold weather; and (3) a lower viscosity of the novel desiccant composition of the invention, which aids in mass transfer during the dehydration and facilitates pumping. Such changes in properties were not predictable from the prior art teachings.

Carbon dioxide is commonly produced from subterranean reservoirs near or above its critical point conditions of temperature and pressure of 87.9° F. and 1071 psia. For transmission, the temperature and pressure of $CO_2$ are maintained near or above its critical point and $CO_2$ is conveniently dehydrated in substantially its supercritical form, that is near or above the critical point of temperature and pressure. Preferably, it is dehydrated at from about 70° F. to about 120° F., and a pressures from about 1071 psia to about 2200 psia, and preferably from about 1200 psia to about 2000 psia. Higher temperature up to about 150° F. and pressures up to about 2400 psia can be used, if desired.

DETAILED DESCRIPTION OF THE INVENTION

The novel desiccant composition for reducing the moisture content of supercritical $CO_2$ comprises glycerine and a minor amount of at least one bis-hydroxymethyl dioxane. While the desiccant composition can be synthetically prepared by forming an admixture of the desired chemical composition of ingredients, this may be expensive except for the ability it gives to tailor the desiccant composition to the particular stream of moist supercritical $CO_2$ to be dehydrated. However, convenient and inexpensive sources of the desiccant composition of the present invention are compositions of glycerine and bis-hydroxymethyl dioxane, which are present in the effluent stream from the production of epoxy resins. Methods of obtaining the compositions of the present invention from the effluent streams from the production of epoxy resins are known in the art, such as (1) the process of U.S. Pat. No. 4,560,812 directed to the recovery of glycerine from saline waters resulting from the manufacture of epoxy resins by a multi-step process, including the use of electrodialysis, and (2) the process of U.S. Pat. No. 4,599,178 directed to the recovery of glycerine from saline water from the manufacture of epoxy resins by a multi-step process, including extraction with pentanol. The disclosures of which U.S. patents are incorporated herein by reference. The resulting glycerine containing the diglycerols of the invention is dehydrated to obtain a a salt-free product comprising about 80 to 95% glycerine and about 5 to about 20% of the diglycerols of the invention.

The moist supercritical (fluid) $CO_2$ is conveniently treated. e.g., at field locations by contacting the supercritical fluid $CO_2$ near or above its critical point of temperature and pressure with the desiccant composition of the present invention. The moisture loaded desiccant composition is removed from the contacting zone and subjected to desorption or stripping or the like to unload the moisture providing lean desiccant composition for recycle to the contacting zone. Those skilled in the art of gas purification will appreciate that there should be sufficient trays in the various contacting and regeneration zones or units for the effects of the process of the invention to be fully utilized and appreciated. The terms "zones" or "units", as employed in the present application, include, where suitable, the use of segmented equipment operated in series, or the division of one unit or zone into multiple units or zones because of size constraint, etc. For example, a dehydration column can comprise two separate columns in which the solution from the lower portion of the first column can be introduced into the upper portion of the second column, the supercritical $CO_2$ from the upper portion of the first column being fed into the lower portion of the second column. Parallel operation of units or zones, is, of course, well within the scope of the present invention.

As will be understood by those skilled in the art, the desiccant compositions of the invention can contain other conventional materials or additives used in the treating of moist supercritical $CO_2$ for transport or oil recovery use, including corrosion inhibitors, hydrate inhibitor and the like. The amount of moisture to be removed from the moist supercritical $CO_2$ is, of course, a matter of individual choice depending on such factors as expense of materials, logistics of the field location and ultimate use of the dried supercritical $CO_2$.

In one embodiment of the processes according to the present invention, the concentration of bis-hydroxymethyl dioxane is from about 5%w to about 20%w or conveniently from about 10%w to about 20%w based on the total weight of the composition and, preferably, the concentration of bis-hydroxymethyl dioxane is from about 12%w to about 16%w based on the total weight of the composition.

In a further embodiment, the present invention is directed to a process for the reduction of desiccant loss in the drying of moist substantially supercritical carbon dioxide which comprises contacting the moist substantially supercritical carbon dioxide with a desiccant composition comprising glycerine containing up to about 20% by weight of bis-hydroxymethyl dioxane based on the total weight of the composition and recovering substantially supercritical carbon dioxide having reduced moisture concentration.

A process for lowering the viscosity of glycerine desiccant in the drying of moist substantially supercritical carbon dioxide which comprises contacting the moist substantially supercritical carbon dioxide with a desiccant composition comprising glycerine containing up to about 20% by weight of bis-hydroxymethyl dioxane based on the total weight of the composition and recovering substantially supercritical carbon dioxide having reduced moisture concentration.

In another embodiment, the present invention is directed to a process of reducing the freezing point of glycerine desiccant used in the drying of moist substantially supercritical critical carbon dioxide which comprises contacting the substantially supercritical carbon dioxide with a desiccant composition comprising glycerine containing up to about 20% by weight of bis-hydroxymethyl dioxane based on the total weight of the composition and recovering substantially supercritical carbon dioxide having reduced moisture content.

EXAMPLE

The present invention is illustrated by the following example, which should not be regarded as limiting the invention in any way.

EXAMPLE 1

Supercritical carbon dioxide was contacted in a vapor-liquid equilibrium cell contacting zone at 1200 psig and 95° F. or 120° F. with solvent compositions comprising either pure glycerol or a mixture comprising 93% w glycerine and 7% w bis-hydroxymethyl dioxane (BDO). The results of this experiment are set forth in Table 1 below.

TABLE 1

| Desiccant | Temperature | Solubility loss in CO2 (mg/l) |
|---|---|---|
| glycerol | 95 | .060 |
| glycerol + BDO | 95 | .051 |
| glycerol | 120 | .0090 |
| glycerol + BDO | 120 | .0079 |

The above results demonstrate that the desiccant composition of the present invention was unexpectedly useful in that the loss of desiccant composition into the $CO_2$ was reduced. The desiccant composition of the present invention also was found to have a lower viscosity which aids in mass transfer and pumping and a lower freezing point which aids in its transport and use in field locations during cold weather.

What is claimed is:

1. A process for reducing the moisture content of substantially supercritical moist carbon dioxide which comprises contacting moist carbon dioxide at substantially supercritical conditions of temperature and pressure of from 70° F. to 150° F. and 1071 psia to 2400 psia with a desiccant composition comprising glycerine containing 5%w to about 20% by weight of at least one bis-hydroxymethyl dioxane based on the total weight of the composition and recovering substantially supercritical carbon dioxide having reduced moisture content.

2. A process according to claim 1 wherein the concentration of bis-hydroxymethyl dioxane is from about 10% w to about 20% w based on the total weight of the composition.

3. A process according to claim 2 wherein the concentration of bis-hydroxymethyl dioxane is from about 12% w to about 16% w based on the total weight of the composition.

4. A process for the reduction of desiccant loss in the drying of moist substantially supercritical carbon dioxide which comprises contacting the moist substantially supercritical carbon dioxide at substantially supercritical conditions of from 70° F. to 150° F. and 1071 psia to 2400 psia with a desiccant composition comprising glycerine containing 5%w to about 20% weight of bis-hydroxymethyl dioxane based on the total weight of the composition and recovering substantially supercritical carbon dioxide having reduced moisture content.

5. A process according to claim 4 wherein the concentration of bis-hydroxymethyl dioxane is from about 10% w to about 20% w based on the total weight of the composition.

6. A process according to claim 5 wherein the concentration of bis-hydroxymethyl dioxane is from about 12% w to about 16% w based on the total weight of the composition.

* * * * *